United States Patent
Jung

[11] Patent Number: 6,144,420
[45] Date of Patent: Nov. 7, 2000

[54] REFLECTION TYPE PROJECTOR WITH FOUR IMAGING UNITS AND A COLOR WHEEL

[75] Inventor: Myung-ryul Jung, Suwon, Rep. of Korea

[73] Assignee: Samsung Electronics Co., Ltd., Kyungki-do, Rep. of Korea

[21] Appl. No.: 09/057,508

[22] Filed: Apr. 9, 1998

[30] Foreign Application Priority Data

May 27, 1997 [KR] Rep. of Korea ....................... 97-20991

[51] Int. Cl.⁷ ......................... G02F 1/1335; G03B 21/00; G03B 21/26
[52] U.S. Cl. ..................... 349/8; 349/5; 349/6; 353/31; 353/34
[58] Field of Search ................. 349/5, 8, 6, 7; 353/31, 34

[56] References Cited

U.S. PATENT DOCUMENTS

| | | | |
|---|---|---|---|
| 5,260,815 | 11/1993 | Takizawa | 359/41 |
| 5,517,340 | 5/1996 | Doany et al. | 359/40 |
| 5,577,826 | 11/1996 | Kasama et al. | 353/31 |
| 5,829,852 | 11/1998 | Jung | 353/20 |

*Primary Examiner*—William L. Sikes
*Assistant Examiner*—Tarifur R. Chowdhury
*Attorney, Agent, or Firm*—Sughrue, Mion, Zinn, Macpeak & Seas, PLLC

[57] ABSTRACT

A reflection type projector includes: a light source; a polarization beam splitter for transmitting or reflecting an input light according to a polarization component thereof; a dichroic beam splitter, having first and second dichroic reflection surfaces for transmitting or reflecting a ray of one polarized light emitted from the light source and split by the polarization beam splitter to thereby be split into three colors; first, second and third imaging units, respectively disposed at positions corresponding to light output surfaces of the dichroic beam splitter, for forming an image from the input light and reflecting the formed image; a fourth imaging unit for forming an image from a ray of the other polarized light emitted from the light source and split by the polarization beam splitter and reflecting the formed image; a color filter, disposed between the polarization beam splitter and the fourth imaging unit and capable of rotating, for determining the color of a ray proceeding toward the fourth imaging unit; a projection lens unit for magnifying and projecting rays reflected from the first, second, third and fourth imaging units and passing through the polarization beam splitter to be focused on a screen.

7 Claims, 4 Drawing Sheets

REFLECTION TYPE PROJECTOR WITH FOUR IMAGING UNITS AND A COLOR WHEEL

BACKGROUND OF THE INVENTION

1. Field of the Invention

The present invention relates to a reflection type projector using a reflection type image forming means, and more particularly, to a reflection type projector utilizing all the rays emitted from a light source and then separating the emitted light according to a polarization direction so that the intensity of the light projected onto a screen can be increased.

2. Description of the Related Art

In general, a projector is an apparatus for displaying an image formed by an image forming means by projecting the formed image onto a screen using an additional light source. The projector is usually divided into a projection type projector and a reflection type projector depending on the means for forming the image.

FIG. 1 shows an optical system of a conventional reflection type projector. As shown in the drawing, the reflection type projector includes a light source 10 for emitting light, a color wheel 20 for selectively transmitting a predetermined color, such as red, green or blue color, of an input light, a scrambler 30 for mixing rays of the input light having different degrees of intensity into a uniform beam, a focusing lens 32, a collimating lens 34, a polarization beam splitter 40 for changing a proceeding path of an input light, a display device 50 for forming an image by selectively reflecting an input light, and a projection lens unit 60 for projecting an input light onto a screen (not shown).

The light source 10 is comprised of a lamp 11, such as a metal haloid lamp or a xenon arc lamp, for generating light and a reflecting mirror 13 for reflecting the light emitted from the lamp 11. The color wheel 20 is installed along the optical path of the light between the light source 10 and the scrambler 30 to be capable of being rotated by a driving motor 21. The color wheel 20 is composed of equal areas of red (R), green (G) and blue (B) areas. According to the response speed of the display device 50, any one of the R, G and B areas of the color wheel 20 being rotated is positioned along the optical path of the light. Then, an image is formed as the three colors of R, G and B are overlapped in sequence.

The scrambler 30 mixes rays of the input light by diffusingly-reflecting the same such that the input lights are changed into a uniform light. The focusing lens 32 focuses and diverges the light having passed through the scrambler 30 to enlarge the width of the light transmitted. The collimating lens 34 changes the diverging light into a parallel beam.

The polarization beam splitter 40 is disposed along the optical path of the light between the collimating lens 34 and the display device 50, and changes a proceeding path of an input light by selectively transmitting or reflecting the input light at a mirror surface 41 according to the polarization component thereof. That is, the light proceeding from the side of the light source 10 is selectively transmitted or reflected depending on whether the polarization component of the light is a S-polarization beam or an P-polarization beam.

FIG. 1 shows an example in which light transmitted through the polarization beam splitter 40 is used as an effective light. A ferroelectic liquid crystal display (FLCD) of a two dimensional array structure exhibiting a superior response speed is employed as the display device 50. The display device 50 has a plurality of reflection areas of a two dimensional array structure. The reflection areas, each being independently driven, form an image by modulating the polarization direction of an input light.

The light input to the display device 50 is reflected again and re-enters the polarization beam splitter 40. Here, the beam re-entering the polarization beam splitter 40 has its polarization direction changed by 90° by the display device 50. Then, the beam is totally-reflected by the mirror surface 41 of the polarization beam splitter 40 to proceed toward the projection lens unit 60. The beam passes through the projection lens unit 60 and is projected onto a screen (not shown).

Alternatively, a digital mirror device (DMD) can be provided as the display device 50. The DMD is of a two dimensional array structure and includes a plurality of reflection mirrors each being hinge-coupled to be capable of independently pivoting. Each of the reflection mirrors is selectively driven according to a corresponding pixel of an image to change the angle of reflection of light. In the case that the DMD is employed as the display device 50, the polarization beam splitter 40 is not necessary.

According to the conventional reflection type projector, color of an image is embodied by means of the color wheel 20 disposed along an optical path of the light. That is, an image is displayed by sequentially projecting three colors (R, G and B) onto a screen. Therefore, the intensity of light is lowered because the amount of light is theoretically reduced to ⅓ that of the light originally emitted from the light source, thereby reducing the efficiency of the light.

SUMMARY OF THE INVENTION

To solve the above problem, it is an objective of the present invention to provide a reflection type projector in which light emitted from a light source is split to have two optical paths and a color wheel is located along one optical path and additional imaging means along other optical paths so that the efficiency of light is improved.

Accordingly, to achieve the above objective, there is provided a reflection type projector including a light source; a polarization beam splitter for transmitting or reflecting an input light according to a polarization component thereof; a dichroic beam splitter, having first and second dichroic reflection surfaces, for transmitting or reflecting a ray of one polarized light beam emitted from the light source and split by the polarization beam splitter to thereby be split into three colors; first, second and third imaging units, respectively disposed at positions corresponding to light output surfaces of the dichroic beam splitter, for forming an image from the input light and reflecting the formed image; a fourth imaging unit for forming an image from a ray of the other polarized light emitted from the light source and split by the polarization beam splitter and reflecting the formed image; a color filter, disposed between the polarization beam splitter and the fourth imaging unit to be capable of rotating, for determining the color of a ray proceeding toward the fourth imaging unit; and a projection lens unit for magnifying and projecting rays reflected from the first, second, third and fourth imaging units and passing through the polarization beam splitter to be focused on a screen.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
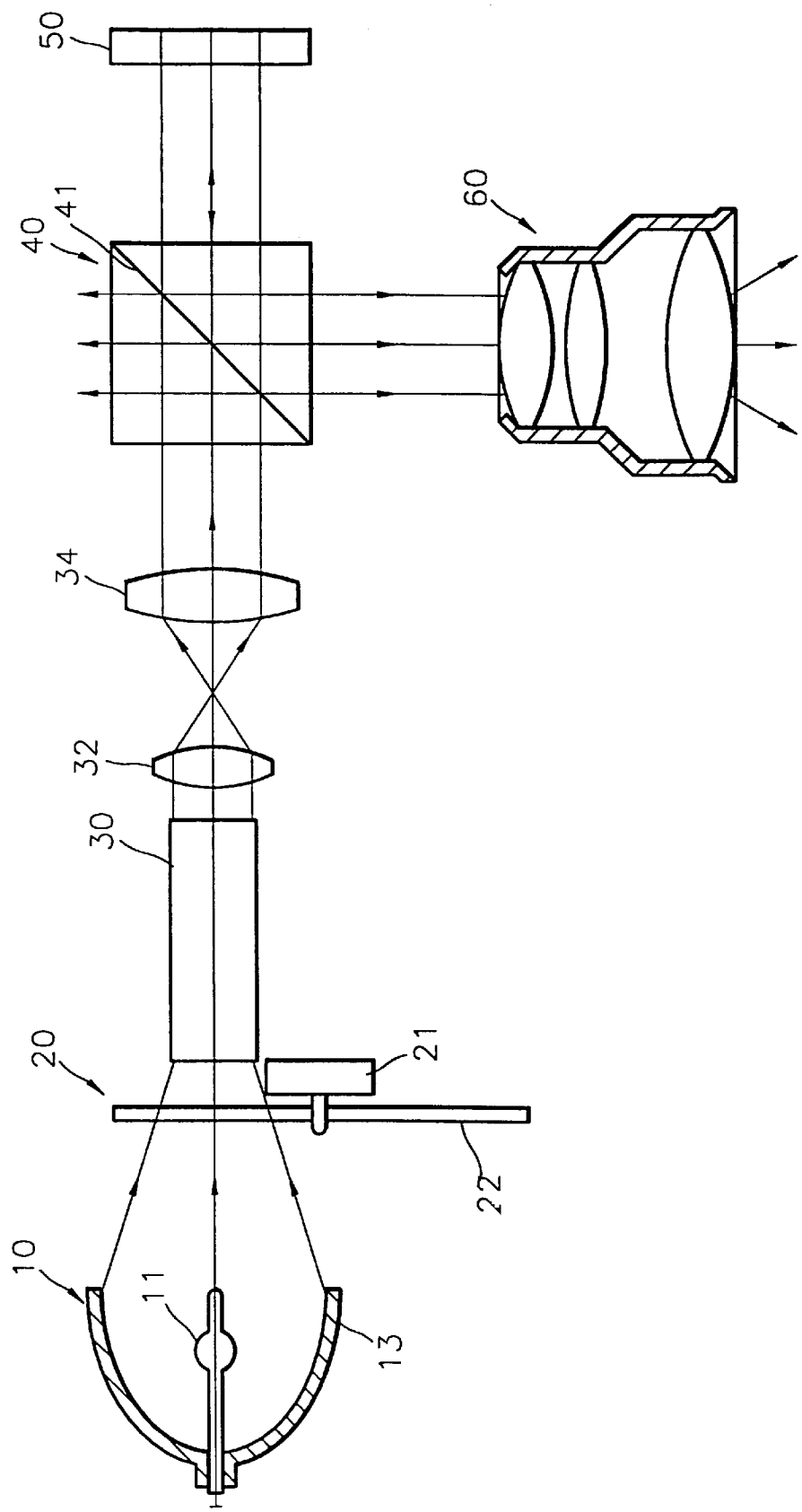
FIG. 1 is a view schematically showing the optical configuration of a conventional reflection type projector.
Figure 2:
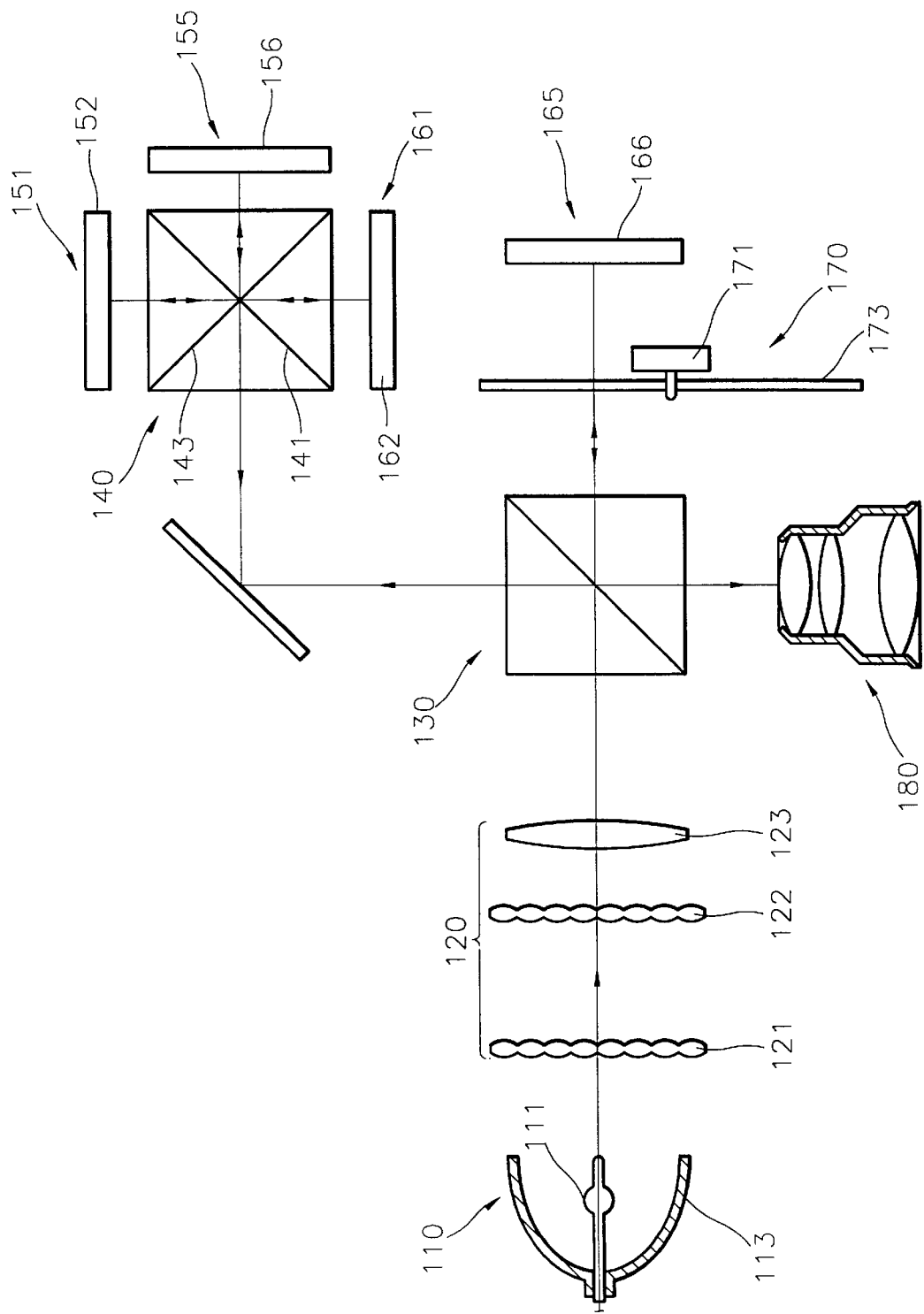
FIG. 2 is a view schematically showing the optical configuration of a reflection type projector according to one preferred embodiment of the present invention.

Referring to FIG. 2, a reflection type projector according to one preferred embodiment of the present invention includes a light source 110 for generating and emitting light; a polarization beam splitter 130 for splitting an input light according to the polarization component of the input light; a dichroic beam splitter 140 having first and second dichroic reflection surfaces 141 and 143; first, second, third and fourth imaging units 151, 155, 161 and 165; a color wheel 170 disposed along the optical path between the polarization beam splitter 130 and the fourth imaging unit 165 for determining the color of light proceeding to the fourth imaging unit 165; and a projection lens unit 180 for projecting an input light onto a screen (not shown) by magnifying the same.

The light source 110 is comprised of a lamp 111 for emitting light and a reflection mirror 113 for reflecting the light emitted from the lamp 111. The reflection mirror 113 can be an oval mirror having one focus at the position of the lamp 111 and the other focus at the position where the reflected light is focused, or a paraboloidal mirror focusing at the position of the lamp 111 and making the light emitted from the lamp and reflected from the mirror a parallel beam.

Figure 3:
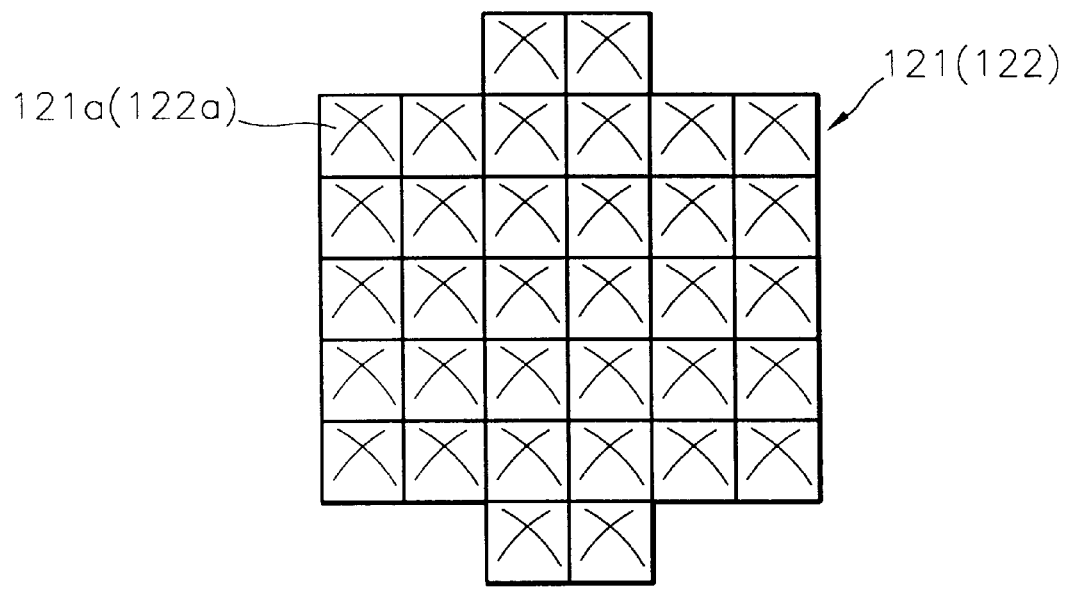
FIG. 3 is a view schematically illustrating the fly-eye lens shown in FIG. 2.

Preferably, a light mixing unit 120 is further installed along the optical path of the light between the light source 110 and the polarization beam splitter 130 to make a light input from the light source 110 a uniform light by diverging/converging or diffused-reflecting the same. Referring to FIG. 2, the light mixing unit 120 is comprised of first and second fly-eye lenses 121 and 122 disposed adjacent to one another and a focusing lens 123 for focusing the light from the second fly-eye lens 122. In this case, it is preferable that a paraboloidal mirror is used as the reflection mirror 113. Each of the first and second fly-eye lenses 121 and 122 has a plurality of rectangular and convex portions 121a and 122a (see FIG. 3) formed at an input and/or output surface thereof for focusing the input light, respectively. The width-to-length ratio of the respective convex portions 121a (122a) is proportional to that of a ferroelectric liquid crystal display (FLCD) or a digital mirror device which will be described later. The light passing through the respective convex portions 121a of the first and second fly-eye lenses 121 and 122 is inputted to the polarization beam splitter 130 in a diverging state after passing the focusing lens 123. Accordingly, light rays of irregular intensity emitted from the light source 110 are mixed by the first and second fly-eye lenses 121 and 122 and thus become a uniform light having regular intensity.

Figure 4:
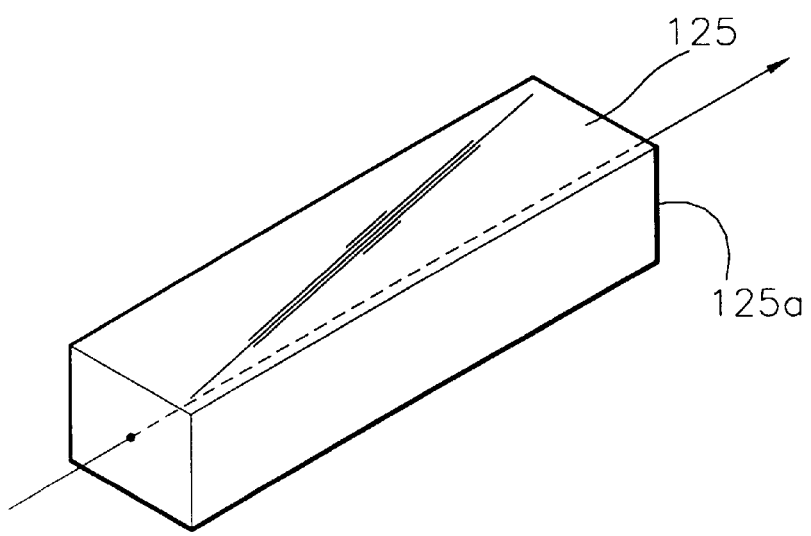
FIG. 4 is a perspective view illustrating a scrambler employed as the light mixing means of the present invention.
Figure 5:
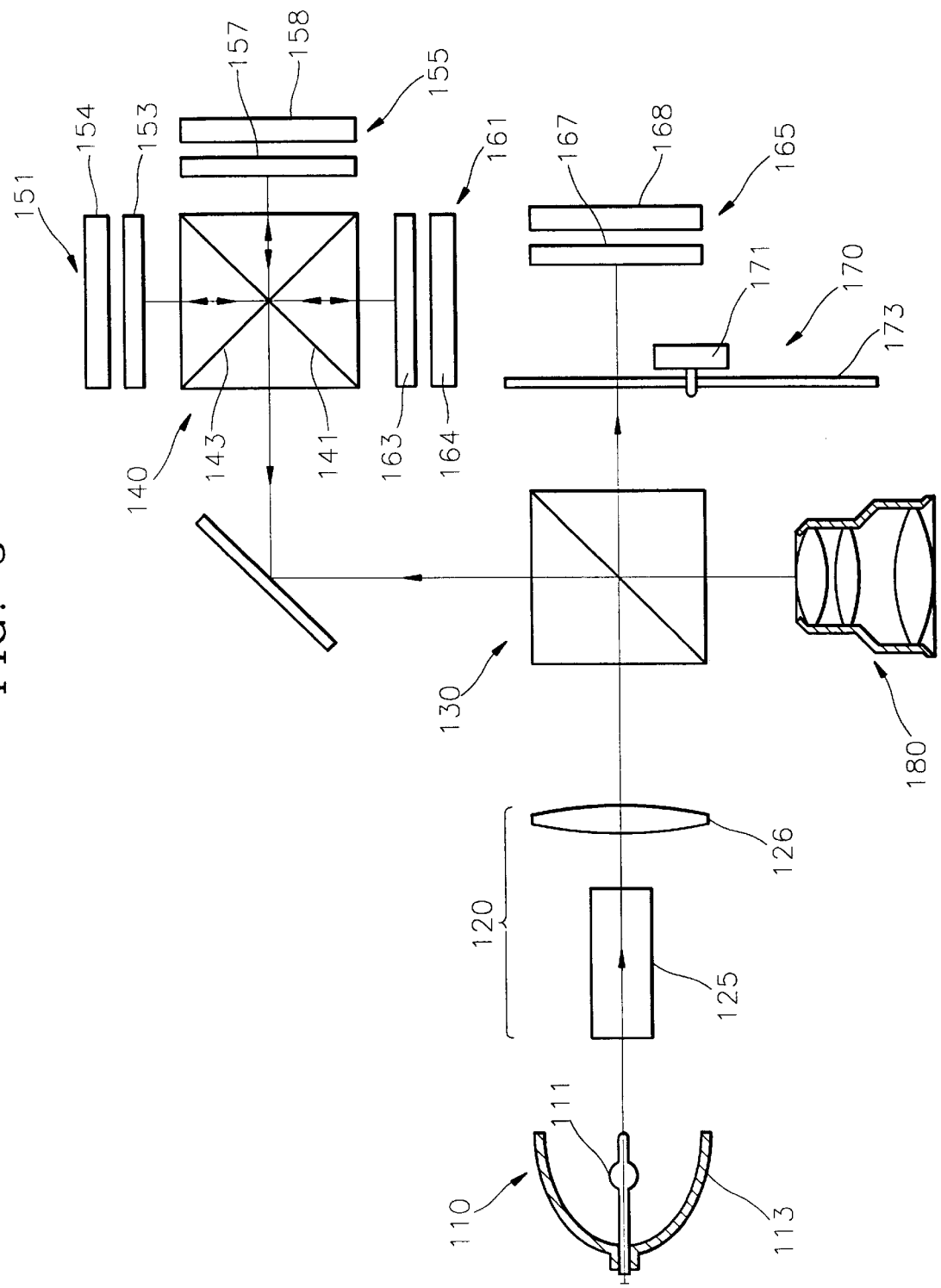
FIG. 5 is a view schematically showing the optical configuration of a reflection type projector according to another preferred embodiment of the present invention.

Alternatively, as shown in FIG. 5, a scrambler 125 which makes an input light into a uniform light by diffusingly-reflecting the same and a focusing lens 126 can be employed as the light mixing unit 120. Referring to FIGS. 4 and 5, the scrambler 125 is a glass rod having an input surface and an output surface both being perpendicular to the optical path of the light. The width-to-length ratio of the output surface 125a of the scrambler 125 is proportional to that of an FLCD or a digital mirror device which will be described later. In the event that the scrambler 125 is employed in the light mixing unit 120, it is preferable that an oval mirror is adopted as the reflection mirror 113. The focusing lens 126 for focusing an input light is disposed along the optical path between the scrambler 125 and the polarization beam splitter 130.

The polarization beam splitter 130 changes the proceeding path of the light emitted from the light source 110 by transmitting or reflecting the same depending on the polarization direction of the input light. That is, the light from the light source 110 is selectively transmitted or reflected depending on the polarization component thereof, i.e., whether it is a P-polarization component or an S-polarization component. FIG. 2 shows an example in which a beam of one polarization component reflected from the polarization beam splitter 130 proceeds toward the dichroic beam splitter 140 and a beam of the other polarization component is transmitted through the polarization beam splitter 130 to proceed to the color wheel 170. Here, it is possible to allow the beam passing through the polarization beam splitter 130 to proceed toward the dichroic beam splitter 140 and the beam reflected from the polarization beam splitter 140 to proceed toward the color wheel 170.

The dichroic beam splitter 140 having first and second dichroic reflection surfaces 141 and 143 splits the beam of one polarization component such as an S-polarization component, which is reflected from the polarization beam splitter 130, by transmitting or reflecting the beam according to the respective wavelengths thereof to proceed toward each of the first, second and third imaging units 151, 155 and 161.

For instance, the first dichroic reflection surface 141 reflects a beam corresponding to red (R) and transmits the beams corresponding to blue (B) and green (G), so that the beam of the red color can be input to the first imaging unit 151. The second dichroic reflection surface 143 reflects a beam corresponding to blue (B) and transmits the beams corresponding to red (R) and green (G), so that the beam of the blue color can be input to the third imaging unit 161. A beam of green (G) transmitting through both the first and second dichroic reflection surfaces 141 and 143 is input to the second imaging unit 155.

The first, second and third imaging units 151, 155 and 161 include FLCDs 152, 156 and 162, respectively. The respective FLCDs 152, 156 and 162 include a plurality of pixels of a two dimensional array structure, each being independently driven, to form an image and reflect the same. The light reflected from the driven pixel of the FLCD and the light reflected from the pixels which are not driven have different polarization components from each other. For instance, when the light of an S-polarization component reflected, from the polarization beam splitter 130 is input to the FLCDs 152, 156 and 162, the light reflected from the driven pixel has a P-polarization component in which the polarization direction is changed by 90°. Whereas the light reflected from the pixels that are not driven has an S-polarization component without a change in the polarization direction. Thus, the light reflected from the driven pixel only passes through the dichroic beam splitter 140 and the polarization beam splitter 130 to proceed toward the projection lens unit 180.

The color wheel 170 and the fourth image generating unit 165 embodies color using the light passing through the polarization beam splitter 130, e.g., the light of a P-polarization component.

The color wheel 170 is disposed between the polarization beam splitter 130 and the fourth imaging unit 165 and includes a color filter 173 and a driving source 171 for rotating the color filter 173. The color filter 173 is formed of three colors such as red (R), green (G) and blue (B), or yellow (Y), cyan(C) and magenta (M), and each color of the filter is selectively disposed along the optical path of the light such that the light input from the light source 110 can be selectively transmitted according to the wavelength thereof. The color filters 173 are arranged on the entire wheel to cover the same area. Preferably, the fourth imaging unit 165 is an FLCD 166.

Here, the respective first, second and third imaging units 151, 155 and 161 independently realize an image corresponding to each color to be simultaneously focused on a screen (not shown). The fourth imaging unit 165 represents the three colors in sequence which are focused on the screen. Thus, the response speed of the fourth imaging unit 165 is faster than those of the respective first, second and third imaging units 151, 155 and 161.

The operation of the reflection type projector according to the embodiment of the present invention will now be described.

Referring to FIG. 2, the light emitted from the light source 110 becomes a uniform light after passing through the light mixing unit 120 such as the first and second fly-eye lenses 121 and 122 and the focusing lens 123, proceeding to the polarization beam splitter 130. The light input to the polarization beam splitter 130 is transmitted or reflected according to the polarization component. The light reflected from the polarization beam splitter 130 passes through the dichroic beam splitter 140 to be input to the first, second and third imaging units 151, 155 and 161 which respectively generate images corresponding to the respective colors. The generated images are reflected again and pass through the dichroic beam splitter 140 to be input to the polarization beam splitter 130. Here, since the state of polarization of the light changes in the first, second and third imaging units 151, 155 and 161, the respective lights input from the first, second and third imaging units 151, 155 and 161 pass through the polarization beam splitter 130 and the projection lens unit 180 to be focused on the screen.

While the light input from the light source 110 and passing through the polarization beam splitter 130 passes through the color wheel 170, the color is sequentially selected and an image is formed by the fourth imaging unit 165. The fourth imaging unit 165 changes the polarization direction of the input light and reflects the input light toward the polarization beam splitter 130. The light input to the polarization beam splitter 130 is reflected to focus on the screen by passing through the projection lens unit 180.

Here, the image formed by the first, second and third imaging units 151, 155 and 161 is formed by concurrently overlapping three colors with respect to one frame. The image formed by the fourth imaging unit 165 is formed by sequentially overlapping the respective colors.

Another preferred embodiment of the present invention will now be described with reference to FIG. 5. Here, the same reference numeral indicates the same elements shown in FIG. 2 and thus a detailed description thereof will be omitted.

According to the characteristic feature of another embodiment of the present invention, the first through fourth imaging units 151, 155, 161 and 165 which form an image from the input light, employ phase delay plates 153, 157, 163 and 167 and digital mirror devices (hereinafter referred to as DMDs) 154, 158, 164 and 168, respectively. The respective phase delay plates 153, 157, 163 and 167 are disposed along the optical path to delay the phase of the input light.

It is preferable that a ¼ wavelength plate which changes the polarization direction of the input light is employed as the phase delay plates 153, 157, 163 and 167. Thus, when the S-polarized light reflected from the polarization-beam splitter 130 re-enters via the ¼ wavelength plate and the DMDs 154, 158, 164 and 168, the polarization component of the light changes to P-polarization and the light passes through the polarization beam splitter 130 to proceed toward 5 the projection lens unit 180. Also, when the light of P-polarization which has passed through the polarization beam splitter 130 re-enters via the ¼ wavelength plates and the DMDs 154, 158, 164 and 168, the polarization of the light changes to S-polarization and the light is reflected from the polarization beam splitter 130 to proceed toward the projection lens unit 180.

The description of operation of the reflection type projector according to this embodiment of the present invention will be omitted because the operation thereof is substantially the same as that of the first embodiment.

As described above, in the reflection type projector according to the present invention, there are provided: a structure which sequentially overlaps certain colors for an image of a frame; and a structure which simultaneously overlaps the colors for an image of a frame; wherein the efficiency of use of the light emitted from a light source increases by using two light beams having different optical paths, the light beams being split according to the polarization component of the light. Therefore, the brightness of the screen can be greatly improved.

It is noted that the present invention is not limited to the preferred embodiment described above, and it is apparent that variations and modifications by those skilled in the art can be effected within the spirit and scope of the present invention defined in the appended claims.

What is claimed is:

1. A reflection type projector comprising:

a light source;

a polarization beam splitter for at least one of transmitting and reflecting an input light according to a polarization component thereof;

a dichroic beam splitter, having first and second dichroic reflection surfaces, for at least one of transmitting and reflecting a ray of one polarized light emitted from said light source and split by said polarization beam splitter to thereby be split into three colors;

first, second and third imaging units, respectively disposed at positions corresponding to light output surfaces of said dichroic beam splitter, for forming an image from the input light and reflecting the formed image;

a fourth imaging unit for forming an image from a ray of the other polarized light emitted from said light source and split by said polarization beam splitter and reflecting the formed image;

a color filter, disposed between said polarization beam splitter and said fourth imaging unit and capable of rotating, for determining the color of a ray proceeding toward said fourth imaging unit;

a projection lens unit for magnifying and projecting rays reflected from said first, second, third and fourth imaging units and passing through said polarization beam splitter to be focused on a screen.

2. The reflection type projector as claimed in claim 1, wherein each of said first, second, third and fourth imaging units comprises a ferroelectric liquid crystal display having pixels of a two dimensional array structure for allowing an input light to have a polarization direction independently selected according to each pixel and reflecting the same.

3. The reflection type projector as claimed in claim 1, wherein each of said first, second, third and fourth imaging units comprises a phase delay plate disposed along the optical path of the light for delaying the phase of the input light, and a digital mirror device having a plurality of reflection mirrors of a two dimensional array structure, each mirror being independently driven, for forming an image from the input light reflected therefrom.

4. The reflection type projector as claimed in claim 3, wherein said phase delay plate is a ¼ wavelength plate which delays the phase of the input light by 90°.

5. The reflection type projector as claimed in claim 1, further comprising a light mixing unit disposed along the optical path of the light between said light source and said polarization beam splitter for making the light input from said light source into a uniform light by at least one of diverging/converging and diffusingly-reflecting the same.

6. The reflection type projector as claimed in claim 5, wherein said light mixing unit comprises:

first and second fly-eye lenses disposed to be adjacent to each other and respectively having a plurality of convex portions at an input and/or output surface thereof, each of said convex portions focusing an input light; and a focusing lens for focusing the light passing through said second fly-eye lens to be a parallel beam.

7. The reflection type projector as claimed in claim 5, wherein said light mixing unit is a scrambler of a glass block having input and output surfaces both being perpendicular to the optical path of the light.

* * * * *